United States Patent [19]

Inomata et al.

[11] Patent Number: 5,374,702
[45] Date of Patent: Dec. 20, 1994

[54] CHAIN ORGANOPOLYSILOXANE AND PROCESS FOR PRODUCING THE SAME

[75] Inventors: Hiroshi Inomata; Hirofumi Kishita, both of Annaka; Kouichi Yamaguchi; Kenichi Fukuda, both of Takasaki; Yoshikazu Saito; Nobuyuki Kobayashi, both of Annaka, all of Japan

[73] Assignee: Shin-Etsu Chemical Co., Ltd., Tokyo, Japan

[21] Appl. No.: 196,848

[22] Filed: Feb. 15, 1994

[30] Foreign Application Priority Data

Feb. 15, 1993 [JP] Japan .................. 5-050100
Feb. 15, 1993 [JP] Japan .................. 5-050101
Feb. 15, 1993 [JP] Japan .................. 5-050102

[51] Int. Cl.$^5$ .................................. C08G 77/06
[52] U.S. Cl. .......................... 528/14; 528/18; 528/37; 528/42
[58] Field of Search .................... 528/37, 42, 14, 18

[56] References Cited

U.S. PATENT DOCUMENTS

| | | | |
|---|---|---|---|
| 3,445,426 | 5/1969 | Lee | 528/21 |
| 5,028,679 | 7/1991 | Terae et al. | 528/37 |
| 5,059,668 | 10/1991 | Fukuda et al. | 528/42 |
| 5,118,775 | 6/1992 | Inomata et al. | 528/42 |

*Primary Examiner*—Melvyn I. Marquis
*Attorney, Agent, or Firm*—Oblon, Spivak, McClelland, Maier & Neustadt

[57] ABSTRACT

A chain organopolysiloxane is obtained by polymerizing a fluorine-containing cyclotrisiloxane of the general formula:

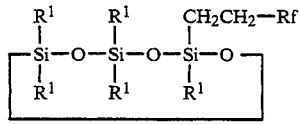

(wherein $R^1$ is a monovalent hydrocarbon group, and Rf is a perfluoroalkyl group or perfluoroalkyl ether group)

in the presence of a lithium silanolate catalyst, silylating the resulting polymerization product, and treating the silylated product at a temperature of not lower than 100° C. under a reduced pressure of not higher than $10^{-1}$ mmHg to remove volatile components therefrom. The organopolysiloxane is essentially free of volatile low-molecular siloxanes. Therefore, the chain organopolysiloxane can be used without the problems which might arise from the volatile low-molecular siloxanes, such as evaporation of low-molecular siloxanes from a cured rubber product with the result of electrical-contact troubles.

11 Claims, 9 Drawing Sheets

Elution time

Elution time

CHAIN ORGANOPOLYSILOXANE AND PROCESS FOR PRODUCING THE SAME

BACKGROUND OF THE INVENTION

1. Field of the Invention

The present invention relates to a new fluorine-containing chain (or linear) organopolysiloxane which does not contain volatile low-molecular siloxanes and has excellent heat resistance, and to a process for producing the same.

2. Description of the Prior Art

Organopolysiloxanes are used in a wide range of industrial fields, because of their low surface tension and low refractive index as well as good heat resistance, cold resistance, electrical insulation properties, water repellency, mold release properties, defoaming properties, chemical resistance and so forth. In order to meet the increasingly higher requirements accompanying the recent technological advances, however, there is a request for development of an organopolysiloxane excellent in various properties.

As a material for fulfilling some of the requirements, for example, organopolysiloxanes having a fluorine-containing organic group in their molecule are known. However, the fluorine-containing organic groups in these organopolysiloxanes are mostly 3,3,3-trifluoropropyl, and, as organopolysiloxanes having a longer-chain fluorine-containing organic group, there are only known those organopolysiloxanes which have in their molecule a fluorine-containing organic group of the following formula:

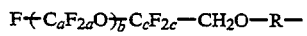

wherein a is an integer of 1 to 3, b is an integer of 1 to 5, c is an integer of 1 or 2, and R is a divalent fluorine-free organic group of 3 to 10 carbon atoms (Refer to Japanese Pre-examination Patent Publication (KOKAI) Nos. 2-219829 (1990) and 2-219830 (1990)). The long-chain fluorine-containing organic groups of the above formula have the disadvantage that the —CH$_2$—O—R— linkage portion is instable at high temperatures, thereby limiting the thermal resistance of the organopolysiloxane.

An organopolysiloxane having a long-chain fluorine-containing organic group such as fluoroalkyl group or fluoropolyether group may be produced by a method in which a cyclotrisiloxane having the relevant fluorine-containing organic group is prepared and the cyclotrisiloxane, either alone or together with a fluorine-free cyclotrisiloxane such as hexamethylcyclotrisiloxane or the like, is subjected to polymerization in the presence of a catalyst such as concentrated sulfuric acid, activated clay, acid-treated activated clay, alkali metal hydroxides or silanolates, quaternary ammonium hydroxides, quaternary phosphonium hydroxides and the like. According to this method, however, depolymerization reaction also is brought about, making it difficult to obtain the desired polymeric product in high yields. Besides, in the case of copolymerizing a fluorine-containing cyclotrisiloxane with a fluorine-free cyclotrisiloxane, the differences between the two cyclotrisiloxanes as to reactivity make it difficult to obtain an organopolysiloxane with the fluorine-containing organic group introduced evenly into each molecule.

According to the method, besides, the depolymerization reaction leads to the formation of such by-products as cyclosiloxanes and low-molecular chain siloxanes, in addition to the desired high-polymeric chain siloxane; particularly, a range of cyclosiloxanes containing 3 to 20 or more siloxane units may be by-produced. Of these by-products, the low-molecular chain siloxanes and the cyclosiloxanes of lower polymerization degrees can be removed by heating the polymerization product under a reduced pressure, but it is very difficult to remove cyclosiloxanes containing 10 or more siloxane units, particularly those containing 20 or more siloxane units. Therefore, when the organopolysiloxane obtained in this manner is used in the form of an oil, a rubber-like cured product, a coating or the like according to the known art, the cyclosiloxanes contained in the organopolysiloxane will gradually evaporate or bleed out of the oil, rubberlike cured product, coating or the like, resulting in such problems as electrical contact troubles in the electrical field and environmental pollution in the building material field.

Methods have been known for producing an organopolysiloxane without by-producing low-molecular siloxanes or cyclosiloxanes. For example, a method in which hexamethylcyclotrisiloxane or the like is polymerized by use of a catalyst represented by the following formula:

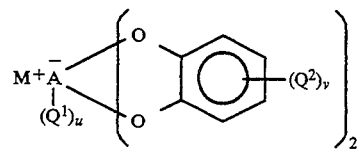

wherein M is an alkali metal,

A is a silicon atom or a boron atom,

Q$^1$ and Q$^2$ are each independently a monovalent hydrocarbon group such as alkyl, U is 1 where A is a silicon atom, and 0 where A is a boron atom, and V is an integer of 0 to 2 has been proposed (Refer to Japanese Patent Publication (KOKOKU) No. 45-1070 (1970), and U.S. Pat. No. 3,445,426). It has been found, however, that even where such catalyst is used, cyclosiloxanes containing 10 or more siloxane units will be produced in an amount of 400 ppm or more.

Also known are methods of producing a monodisperse organopolysiloxane by homopolymerization of hexamethyltrisiloxane or block copolymerization of hexamethyltrisiloxane with hexaphenyltrisiloxane or the like, using a lithium silanolate or an organolithium compound as a catalyst (Refer, for example, to Japanese Patent Publication (KOKOKU) No. 46-27267 (1971); E. E. Bostick, ACS Polymer Preprint, Vol. 10, No. 2, p. 877 (1969); and Japanese Pre-examination Patent Publication (KOKAI) No. 1-294738 (1989)). However, these methods, like the above-described one, are disadvantageous in that cyclosiloxanes composed of 10 or more siloxane units are unavoidably formed in an amount of 2000 ppm or more.

Further, methods of removing low-molecular siloxanes or cyclosiloxanes by such means as stripping under a reduced pressure, extraction with solvent and the like have been practiced (Refer to, for example, Japanese Pre-examination Patent Publication (KOKAI) No. 64-69306 (1989)). However, these methods are not for preventing the formation of by-products such as cyclosiloxanes, but aim at enhancing the level of purification in terms of the upper limit to the number of siloxane units contained in the cyclosiloxanes which can be removed from the desired polymeric product.

SUMMARY OF THE INVENTION

It is accordingly an object of the present invention to provide a fluorine-containing chain organopolysiloxane which has excellent thermal resistance.

It is another object of the present invention to provide a process for producing a fluorine-containing chain organopolysiloxane which is substantially free of cyclosiloxanes or low-molecular siloxanes.

Namely, the present invention provides a chain organopolysiloxane having the following general formula (1):

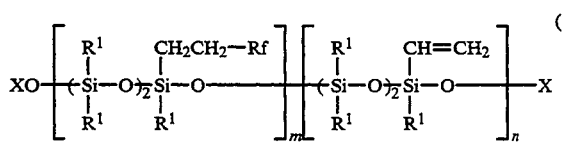

wherein $R^1$ are each independently an unsubstituted or substituted monovalent hydrocarbon group, Rf are each independently a fluorine-containing group of the following formula (1a):

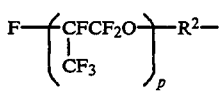

or the following formula (1b):

$$C_L F_{2L+1}- \quad (1b)$$

wherein in the formulas (1a) and (1b), $R^2$ is $-CF(CF_3)-$, $-CF_2CF_2-$ or $-CF(CF_3)CF_2-$, p is an integer of 1 to 5, and L is an integer of 1 to 20, X are each a hydrogen atom or a group of the following formula (1c):

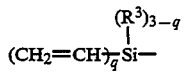

wherein $R^3$ is an unsubstituted or substituted monovalent hydrocarbon group, and q is an integer of 0 to 3, m is an integer of 15 to 4000, and n is an integer satisfying the relationship of $$0 \leq \frac{n}{n+m} \leq 0.1,$$

wherein the content of cyclopolysiloxanes having a molecular weight of 3000 or less in said chain organopolysiloxane is not more than 50 ppm.

The present invention also provides a process for producing the above-described chain organopolysiloxane, comprising the steps of:

polymerizing a fluorine-containing cyclotrisiloxane of the following general formula (2):

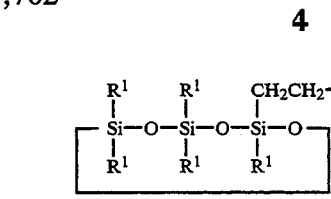

(wherein $R^1$ and Rf are as defined above) or a mixture of said fluorine-containing cyclotrisiloxane and a vinyl-containing cyclotrisiloxane of the following general formula (3):

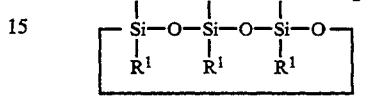

(wherein $R^1$ is as defined above) in the presence of a lithium silanolate catalyst or a catalyst represented by the following general formula (4):

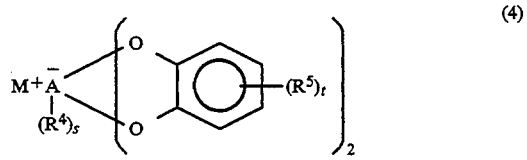

wherein $R^4$ and $R^5$ are each independently a monovalent organic group,

M is $(R^6)_4N$, $(R^6)_4P$ or an alkali metal atom (wherein $R^6$ is a monovalent organic group), A is a silicon atom or a boron atom, s is 1 where A is a silicon atom, and 0 where A is a boron atom, and t is an integer of 0 to 2; and subjecting the resulting polymerization product to a purification treatment comprising heating under reduced pressure or extraction with solvent or both, thereby removing volatile components from the polymerization product.

DETAILED DESCRIPTION OF PREFERRED EMBODIMENTS

Chain organopolysiloxane

Figure 1:
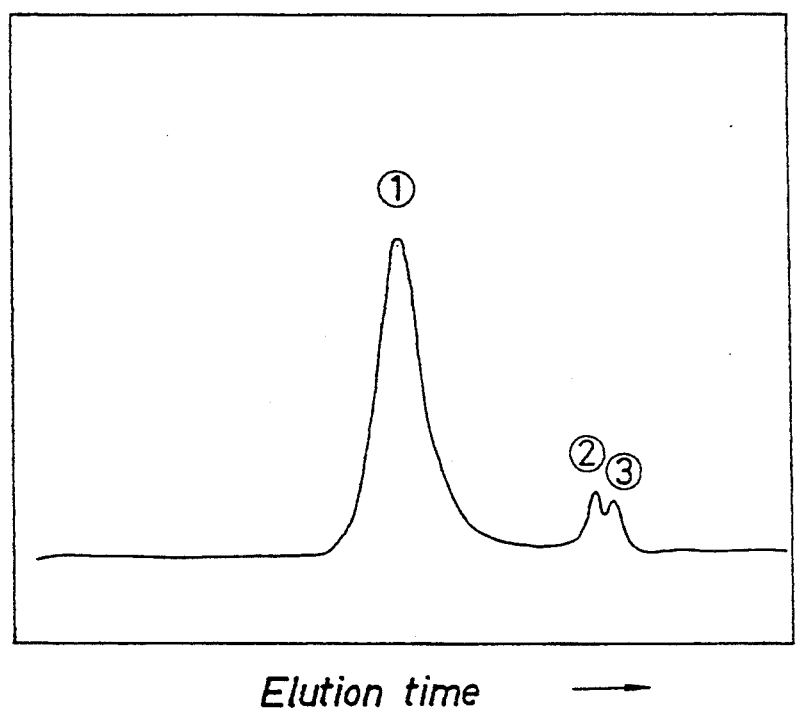
FIG. 1 shows a GPC chart of an organopolysiloxane not yet purified, obtained in Example 1.

The chain organopolysiloxane according to the present invention has the above general formula (1). As is clear from the formula, the perfluoro group Rf of a straight-chain or polyether structure is linked to the Si atom through an ethylene group, thereby imparting high thermal stability to the organopolysiloxane.

The chain organopolysiloxane is produced by subjecting a fluorine-containing cyclotrisiloxane of the above general formula (2) to anionic ring-opening polymerization using a lithium silanolate catalyst or a catalyst represented by the above general formula (4). Because depolymerization and rearrangement of siloxane are largely restrained during polymerization, the chain organopolysiloxane produced has a characteristic molecular structure in which one perfluoro group Rf in the fluorine-containing cyclotrisiloxane is present every 3 siloxane units.

In the general formula (1) above, the unsubstituted or substituted monovalent hydrocarbon group $R^1$ includes, for example, alkyl groups such as methyl, ethyl, propyl, butyl, pentyl, hexyl and the like; alkenyl groups such as vinyl, allyl, hexenyl and the like; aryl groups such as phenyl, tolyl and the like; aralkyl groups such as benzyl, phenylethyl and the like; and groups derived from these groups by substitution of part or all of the hydrogen atoms in these groups with a halogen atom or the like, such as chloromethyl, 3,3,3-trifluoropropyl and so forth. Among these monovalent groups applicable as $R^1$, preferred are those having 1 to 6 carbon atoms, and particularly preferred are methyl, phenyl and the like.

Rf are each independently a fluorine-containing organic group represented by the above formula (1a) or (1b). The fluorine-containing organic group of the formula (1a) includes, for example,

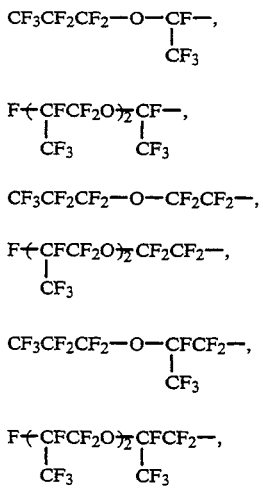

and the like, whereas the fluorine-containing group of the formula (1b) includes, for example,

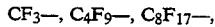

and the like.

X are each a hydrogen atom or a group represented by the formula (1c) above. In the formula (1c), $R^3$ is a unsubstituted or substituted monovalent hydrocarbon group, examples of which include alkyl groups such as methyl, ethyl, propyl and the like; alkenyl groups such as vinyl, allyl, hexenyl and the like; and groups derived from these groups by substitution of part or all of the hydrogen atoms with a halogen atom, cyano group, alkoxyl group or the like, such as chloroethyl, chloropropyl, cyanoethyl, methoxyethyl and so forth. Among the groups applicable as Besides, in the general formula (1), m is an integer of 15 to 4000, and n is an integer satisfying the relationship of $$0 \leq \frac{n}{n + m} \leq 0.1.$$

The chain organopolysiloxane of the present invention as above-described has functional groups at both terminal ends and in side chains, and can therefore be cured by known methods such as addition curing, condensation curing, peroxide curing, etc. using an appropriate crosslinking agent or catalyst, to give a cured product.

Process for producing chain organopolysiloxane

The chain organopolysiloxane according to the present invention is produced by using as a starting material a fluorine-containing cyclotrisiloxane of the above general formula (2) or a mixture of the cyclotrisiloxane with a vinyl-containing cyclotrisiloxane of the above general formula (3). Namely, the chain organopolysiloxane can be obtained by polymerizing the starting material in the presence of a lithium silanolate catalyst or a catalyst represented by the above general formula (4) with heating, and subjecting the polymerization product to purification to remove volatile components therefrom.

Starting material

In the case of producing a chain organopolysiloxane having the above general formula (1) with n being 0, the fluorine-containing cyclotrisiloxane of the formula (2) above is used alone as the starting material. On the other hand, in the case of producing a chain organopolysiloxane having the general formula (1) with n being at least 1, a fluorine-containing cyclotrisiloxane of the formula (2) and a vinyl-containing cyclotrisiloxane of the formula (3) are used in combination as the starting material.

In the present process, it is of great importance to use the fluorine-containing cyclotrisiloxane of the general formula (2), whereby polymerization using the catalyst such as lithium silanolate can be achieved while effectively preventing the formation of cyclosiloxanes containing 10 or more siloxane units. That is to say, in view of the aforementioned fact that use of hexamethyltrisiloxane as starting material would cause cyclosiloxanes containing 10 or more siloxane units to be formed in an amount of several hundreds of ppm or more, the use of the fluorine-containing cyclotrisiloxane of the formula (2) according to the inventive process presumably contributes greatly to prevention of the formation of cyclosiloxanes during the polymerization. Although the reason for this contribution has not yet been elucidated, a possible reason may be that the three siloxane linkages in the molecule of the fluorine-containing cyclotrisiloxane are not equivalent in regard of reactivity.

Thus, where such a fluorine-containing cyclotrisiloxane is used as the starting material for polymerization, the resulting polymeric product is essentially free of cyclosiloxanes composed of 10 or more siloxane units. The polymeric product contains only trace amounts of cyclosiloxanes composed of less than 10 siloxane units and low-molecular siloxanes, and these by-products can be removed easily by a purification treatment, which will be described later.

In the process of the present invention, the most preferable examples of the fluorine-containing cyclotrisiloxane represented by the above formula (2) include cyclotrisiloxanes having the following formula:

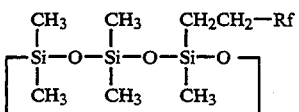

wherein Rf is as defined above.

The fluorine-containing cyclotrisiloxanes can be prepared, for example, by bringing a dichlorosilane compound having a corresponding fluorine-containing group and a disiloxane such as tetramethyldisiloxane diol into a dehydrochlorination reaction, as represented by the following formula:

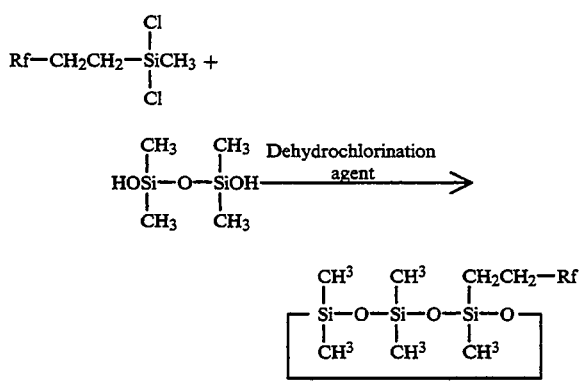

(wherein Rf is as defined above).

The fluorine-containing cyclotrisiloxane is used in an amount which is selected according to polymerization conditions, etc. so that the value of m in the general formula (1) will fall within the above-specified range, namely, from 15 to 4000.

The dehydrochlorination agents which can be used here include, for example, tertiary amines such as triethylamine or the like, cyclic amines containing no active hydrogen, such as pyridine or the like, and so forth.

On the other hand, the most preferable examples of the fluorine-containing vinyl cyclotrisiloxane of the formula (3), to be used for preparing a chain organopolysiloxane having the general formula (1) with n being not less than 1, include cyclotrisiloxanes having the following formula:

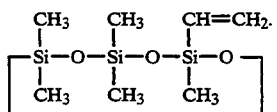

The vinyl-containing cyclotrisiloxane of the formula (3) is used in an amount which is determined according to polymerization conditions, etc. so that n in the general formula (1) will satisfy the relationship of $$\frac{n}{n+m} \leq 0.1.$$

Polymerization catalyst

In the process of the present invention, a lithium silanolate may be used as a polymerization catalyst.

Preferable examples of the lithium silanolate include the following:

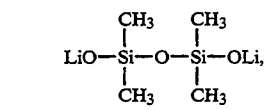

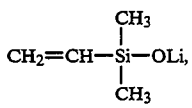

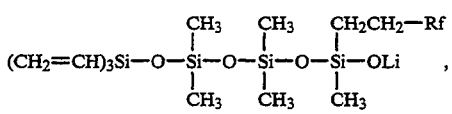

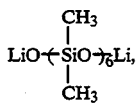

and

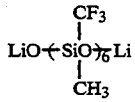

wherein Rf is as defined above.

The lithium silanolate is used in an amount which is not particularly limited and is selected according to the polymerization degree of the chain organopolysiloxane desired. Normally, the amount of the lithium silanolate is selected so that the molar ratio of the total amount of Si atoms in the fluorine-containing cyclotrisiloxane of the formula (2) used as the starting material to the amount of the catalyst molecules will be on the order of 100 to 10,000.

Besides the lithium silanolates, in the process of the present invention, catalysts represented by the aforementioned general formula (4) may be used as a polymerization catalyst. Use of the catalyst of the formula (4) is preferred in the case of using the fluorine-containing cyclotrisiloxane of the general formula (2) solely as the starting material for polymerization, and is most preferred in the case of synthesizing a chain organopolysiloxane of the general formula (1) wherein X is a hydrogen atom. In the general formula (4), the monovalent organic groups $R^4$ to $R^6$ may be the same or different from each other, and include, for example, alkyl groups such as methyl, ethyl, propyl, isopropyl, octadecyl and the like; cycloalkyl groups such as cyclohexyl and the like; aliphatic unsaturated groups such as vinyl, allyl, ethynyl and the like; aryl groups such as phenyl, tolyl, xenyl and the like; aralkyl groups such as benzyl, phenylethyl and the like; and groups derived from these groups by substitution of part or all of the hydrogen atoms therein with a halogen atom, such as chloromethyl, chloroethyl and so forth.

Of the catalysts represented by the general formula (4), the most preferable examples include the followings:

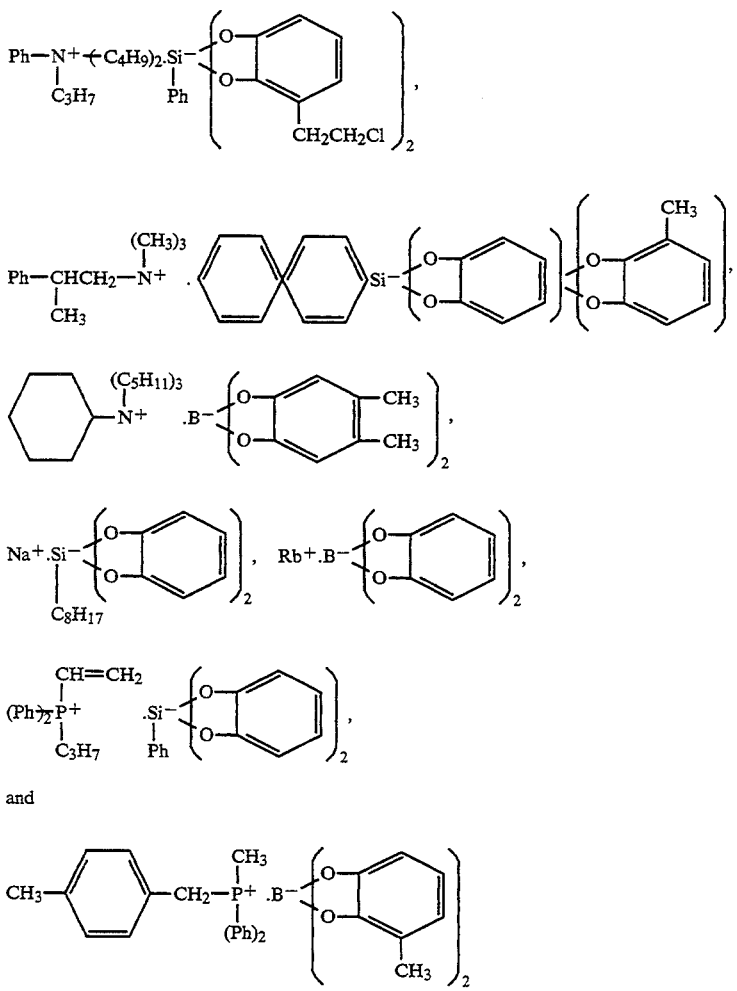

(Ph: phenyl group).

The polymerization catalyst represented by the formula (4) above is normally used in an amount of not more than 0.05% by weight, particularly in an amount of 0.001 to 0.02% by weight, based on the fluorine-containing cyclotrisiloxane of the formula (2).

Polymerization conditions

According to the present invention, the polymerization reaction using the polymerization catalyst as described above is normally performed under polymerization conditions which are selected according to the molecular structure of the chain organopolysiloxane desired, the kind of the polymerization catalyst used, etc. so that polymerization time will be in the range from several minutes to several tens of hours, preferably not more than 10 hours.

For instance, polymerization temperature is preferably not higher than 150° C., more preferably in the range of 20° to 100° C., where the lithium silanolate catalyst is used. Specifically, where the desired product is a chain organopolysiloxane of the general formula (1) with X being a hydrogen atom, polymerization temperature preferably ranges from 40° to 150° C., more preferably from 60° to 110° C. Where the catalyst of the formula (4) is used, polymerization temperature is set below the decomposition temperature of the catalyst and preferably in the range of 25° to 200° C., more preferably 50° to 150° C. Whichever catalyst is used, too high a polymerization temperature leads to an increase in the amount of low-molecular cyclosiloxanes by-produced. This point should be taken into account in selecting the polymerization temperature.

The polymerization reaction may be carried out either in a solventless system or in a solvent system. Where the polymerization catalyst of the formula (4) is used, it is preferable to carry out the reaction in the presence of a polar solvent. As the polar solvent, for example, acetonitrile, dimethyl sulfone, tetramethylene sulfone, diethyl sulfone, methyl propyl sulfone and the like can be used, in an amount such that the polymerization catalyst of the formula (4) is dissolved satisfactorily. On the other hand, where the lithium silanolate catalyst is used, the polymerization reaction is suitably carried out in the presence of an aprotic solvent such as tetrahydrofuran, dioxane, diglyme, tetraglyme and the like, or a fluorine- or chlorine-containing inert solvent such as flons, metaxylene hexafluoride, methylene chloride, trichloromethane and the like.

Further, where the desired substance is a chain organopolysiloxane having the general formula (1) with X being a hydrogen atom, it is desirable to conduct the polymerization reaction in the presence of a small amount of water, in order to terminate the growing molecular chains with a silanol group. In this case, water may be added in the form of a mixture with a hydrophilic solvent such as dioxane, glyme, THF or the like, in an amount such that the molar ratio of Si/H₂O in the reaction system is on the order of 20 to 6000.

Stabilization of polymerization product

The polymerization product obtained upon the above-described polymerization normally contains the polymerization catalyst. Therefore, it is desirable to inactivate the catalyst, thereby stabilizing the polymerization product.

Such inactivation of catalyst can be easily achieved. For example, where a lithium silanolate is used as polymerization catalyst, the catalyst can be inactivated by neutralizing it through mixing an acidic substance such as diluted hydrochloric acid, diluted sulfuric acid, phosphoric acid, acetic acid, tetrachloroethane and the like into the reaction mixture. Normally, the amount of the acidic substance to be used is preferably about 2 to about 5 equivalents per equivalent of the lithium silanolate. Where the catalyst of the formula (4) is used for polymerization, the catalyst can be inactivated by heating to a temperature of not lower than 200° C., or by adding a weak acid such as carbon dioxide, acetic acid and the like to the reaction mixture.

After the above-described treatment, the resulting salts, excess acidic substance and the like are removed from the polymerization product, whereby a chain organopolysiloxane terminated with a silanol group, namely, a chain organopolysiloxane having the general formula (1) with X being a hydrogen atom, can be obtained.

Silylation

According to the present invention, if the desired product is a chain organopolysiloxane having the general formula (1) wherein X is a triorganosilyl group of the aforementioned formula (1c), the polymerization product obtained as above-described is further subjected to silylation. The silylation is carried out by using a silylating agent represented by the following general formula (5):

$$(CH_2=CH)_q Si-Y \quad (R^3)_{3-q} \tag{5}$$

wherein R³ and q are as defined above, and Y is a hydrolyzable group.

The hydrolyzable group Y in the above formula (5) includes, for example, halogen atoms such as chlorine and the like, and alkoxyl groups such as methoxyl, ethoxyl and the like. Typical examples of the silylating agent of the formula (5) include: triorganohalosilanes such as (CH₃)₃Si—Cl, (CH₂=CH)₃Si—Cl,

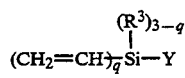

and the like; triorganoalkoxysilanes such as (CH₃)₃Si—OCH₃,

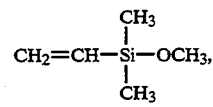

and the like; triorganoacetoxysilanes such as

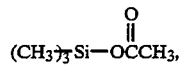

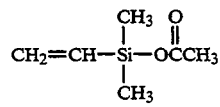

and the like; and triorganoacyloxysilanes such as

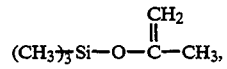

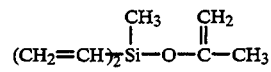

and the like.

The silylating agent is used preferably in an amount of around 1 to 5 moles per mole of the catalyst used for polymerization. The silylation reaction temperature is preferably 10° to 100° C., and the reaction time is preferably 2 to 20 hours.

Besides, where the aforementioned triorganohalosilane is used as the silylating agent, a disilazane compound having the following formula (6):

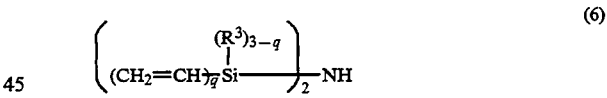

(wherein R³ and q are as defined above) is preferably used together. Use of the disilazane compound together with the silylating agent is advantageous in that the silylation can be conducted immediately upon completion of the polymerization, without carrying out the neutralization treatment for the polymerization catalyst described above. Typical examples of the disilazane compound include:

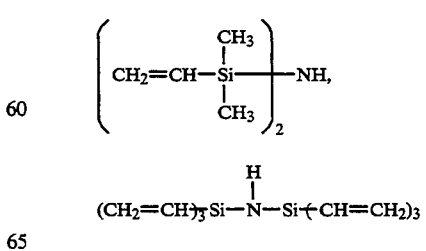

and the like.

In this case, it is preferable to use the triorganohalosilane in an amount of 1 to 3 moles and the disilazane compound in an amount of around 1.5 to 4.5 moles, per mole of the catalyst.

Purification

According to the present invention, after the catalyst inactivation treatment or the silylation treatment described above, the polymerization product is subjected to purification for removing therefrom low-molecular siloxanes such as cyclosiloxanes having a polymerization degree of less than 10, whereby a desired chain organopolysiloxane having the general formula (1) can be obtained.

The purification, after the catalyst inactivation or the silylation, may be carried out by heating the reaction mixture to a temperature of not lower than 100° C. under a reduced pressure of not higher than $10^{-1}$ mmHg. In this case, where the desired substance is a chain organopolysiloxane terminated with a triorganosilyl group, the heating temperature is preferably set in the range of 200° to 300° C. Where a chain organopolysiloxane terminated with a silanol group is desired, on the other hand, the heating temperature is preferably in the range of 100° to 180° C. Heating to an excessively high temperature would result in condensation of terminal silanol groups with each other. The purification by heating under a reduced pressure as described above can be suitably carried out, for example, by using a thin-film type evaporation device.

Furthermore, instead of the above-described heating under a reduced pressure or in combination therewith, extraction with solvent may be employed to achieve purification. The solvent for extraction is not particularly restricted and may be any one of those solvents which dissolve low-molecular siloxane components put which neither dissolve the desired chain organopolysiloxane nor break the polymer chain of the organopolysiloxane. Normally, polar solvents such as acetone, methyl ethyl ketone and methyl isobutyl ketone, aromatic hydrocarbon solvents such as toluene and xylene, and so forth may be used suitably. After the low-molecular siloxane components are removed by the extraction with a solvent, the remaining solvent is removed by reducing pressure, whereby the desired chain organopolysiloxane can be obtained.

The chain organopolysiloxane obtained in this manner has highly excellent thermal resistance and contains volatile low-molecular siloxanes, for example, cyclosiloxanes with molecular weights of not more than 3000, in a very small limited amount of 50 ppm or less. Therefore, the chain organopolysiloxane can be used for various applications while effectively overcoming the problems which would arise from the presence of volatile low-molecular siloxanes, such as evaporation of low-molecular siloxanes out of cured rubber products with the result of electrical-contact troubles (especially in the electrical field), environmental pollution (in the architectural field), etc.

EXAMPLES

In the following examples, viscosity is given in values measured at 25° C.

Example 1

A 1-liter separable flask equipped with a stirrer was charged with 1000 g (1.458 mol) of a cyclotrisiloxane having the following formula:

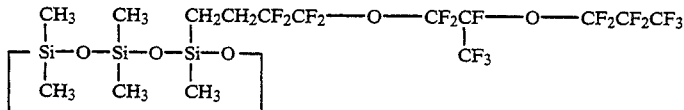

23.2 g (0.0292 mol) of a lithium silanolate having the following formula:

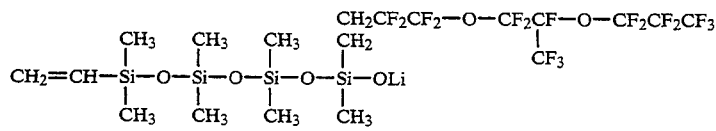

and 1.0 g of tetraglyme. The mixture in the flask was heated to 100° C. in a nitrogen atmosphere, and reacted for 5 hours.

Next, the temperature was lowered to 50° C., at which 5.3 g (0.0438 mol) of a halosilane having the following formula:

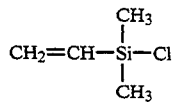

and 12.2 g (0.0657 mol) of a disilazane having the following formula:

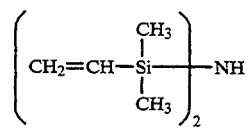

were charged into the flask, followed by stirring for 2 hours to effect neutralization and silylation.

Thereafter, the reaction mixture was subjected to stripping at 150° C. under a reduced pressure, and salts were removed therefrom by filtration, to yield 983 g of a polysiloxane (viscosity: 798 cSt). When the polysiloxane was dissolved in trichlorotrifluoroethane (flon-113) and the resulting solution (concentration: 1%) was subjected to GPC analysis, the chart shown in FIG. 1 was obtained. In the chart, the area of the peak 1 due to the polymeric product is about 98%.

Figure 2:
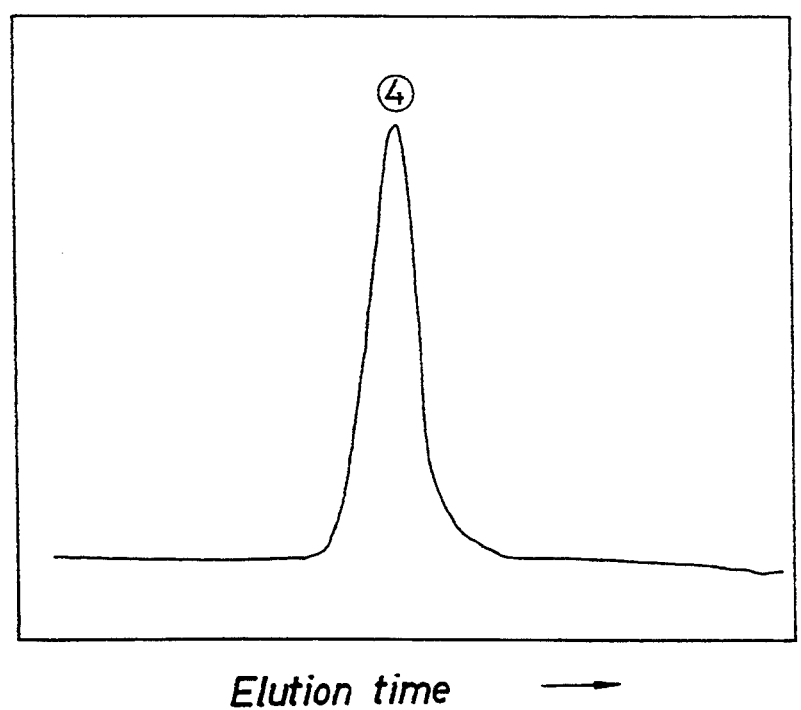
FIG. 2 shows a GPC chart of the organopolysiloxane after purified, obtained in Example 1.

Subsequently, the organopolysiloxane was purified by passing through a thin-film type molecular distillation device under the conditions of 270° C. and $1 \times 10^{-4}$ mmHg, to give 951 g of a purified organopolysiloxane (viscosity: 1160 cSt). When the purified organopolysiloxane was analyzed by GPC in the same manner as above, the GPC chart shown in FIG. 2 was obtained. In the chart the area of the peak 4 due to the polymeric product is 100%, which indicates that the product is substantially free of cyclopolysiloxanes (peaks 2, 3).

For determination of cyclopolysiloxanes, 1.0 g of the produced organopolysiloxane and 10.0 g of acetone containing 20 ppm of n-decane as an internal standard were placed in a capped glass bottle, which was shaken and was let stand still for 24 hours. Then, the amount of cyclopolysiloxanes extracted into the acetone layer was determined by a flame ionization detector (FID) to be 1 ppm or less. This measurement was carried out under the following conditions:

Apparatus used: GC-14A, produced by Shimadzu Corp.

Column: Glass capillary column TC-1701, 0.53 mm ×30 m.

Heating conditions: Initial temperature 70° C. (1 min), rate of temperature rise 15 K/min, final temperature 270° C. (40 min hold).

Figure 3:
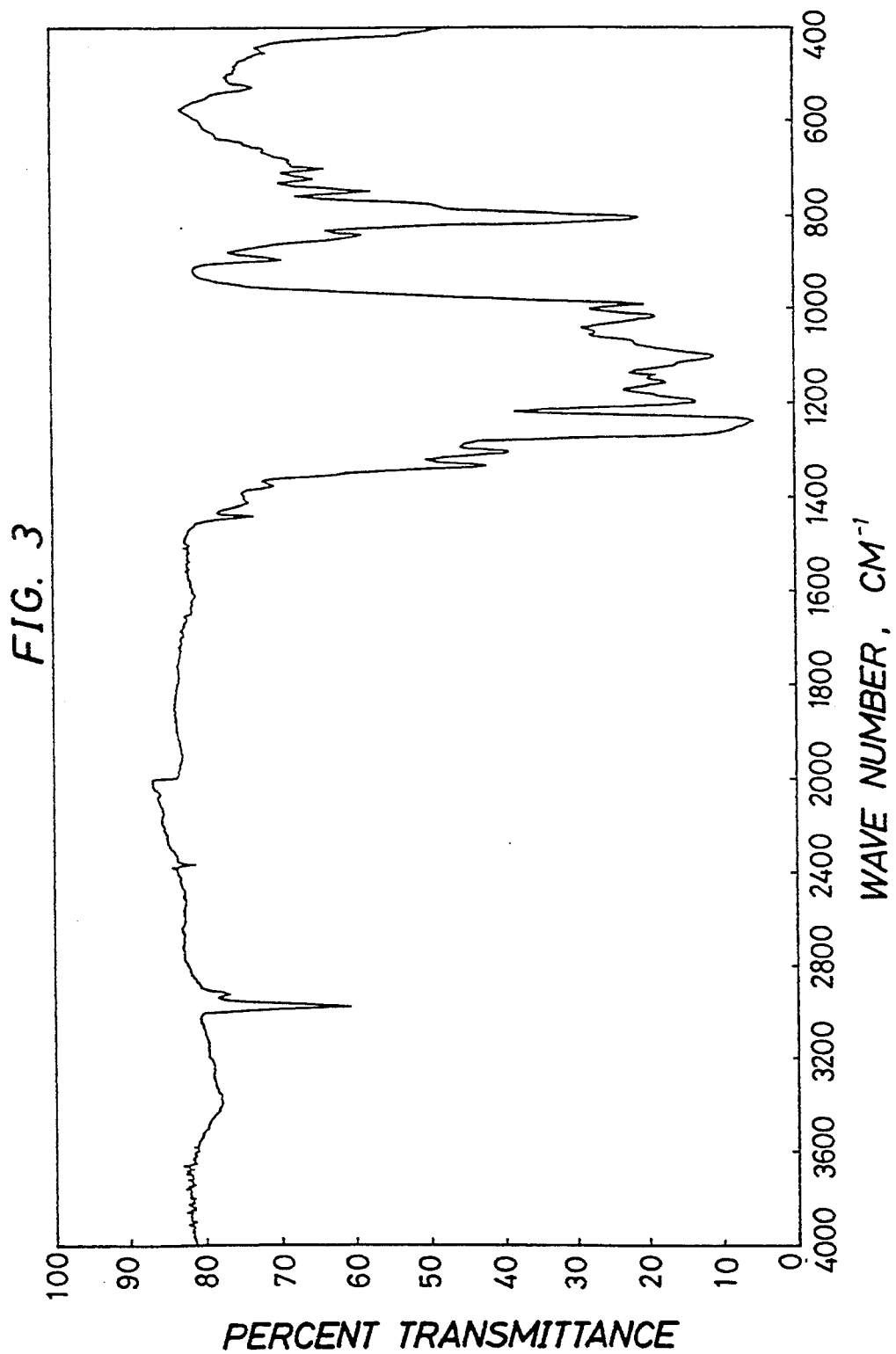
FIGS. 3 to 8 show IR charts of purified organopolysiloxanes obtained in Examples 1 to 6, respectively.

Furthermore, the purified organopolysiloxane obtained above was subjected to measurements of infrared absorption spectrum and $^1$H-NMR and to determination of vinyl groups, to give the results as follows:

—IR absorption spectrum: Chart is shown in FIG. 3.
Characteristic absorptions:
1000–1130 cm$^{-1}$ (Si—O—Si)
2970, 1260, 810 cm$^{-1}$ (Si—CH$_3$)
1000–1400 cm$^{-1}$ (C—F)

| $^1$H-NMR: (flon-113 solvent) δ |
| --- |
| 0.75–1.62 ppm (m —CH$_2$—Si— 2H) |
| 1.83–2.82 ppm (m —CH$_2$—CF 2H) |
| 0.20–0.52 ppm (m —Si—CH$_3$ 15H) |

—Vinyl group determination: Determined by GC-MS.
Amount of terminal vinyl groups:
Found 0.0055 mol/100 g
Calcd. 0.0057 mol/100 g, From the above results, the organopolysiloxane obtained was confirmed to be a chain organopolysiloxane having the following average molecular formula:

$$CH_2=CH\underset{\underset{CH_3}{|}}{\overset{\overset{CH_3}{|}}{Si}}-O\left[\underset{\underset{CH_3}{|}}{\overset{\overset{CH_3}{|}}{(Si-O)_2}}\underset{\underset{CH_3}{|}}{\overset{\overset{CF_2CF_2OCF_2CFOCF_2CF_2CF_3}{|}}{\overset{\overset{CH_2}{|}}{\overset{\overset{CH_2}{|}}{Si}}}}-O\right]_{53}\underset{\underset{CH_3}{|}}{\overset{\overset{CF_3}{|}}{Si}}-CH=CH_2.$$

Example 2

A polymerization reaction was carried out according to the same procedure as in Example 1 except for using 1000 g (2.303 mol) of a compound of the following formula:

$$\left[\underset{\underset{CH_3}{|}}{\overset{\overset{CH_3}{|}}{SiO}}-\underset{\underset{CH_3}{|}}{\overset{\overset{CH_3}{|}}{SiO}}-\underset{\underset{CH_3}{|}}{\overset{\overset{CH_2CH_2C_4F_9}{|}}{SiO}}\right]$$

as a fluorine-containing cyclotrisiloxane and 12.4 g (0.02203 mol) of a compound of the following formula:

$$CH_2=CH-\underset{\underset{CH_3}{|}}{\overset{\overset{CH_3}{|}}{Si}}O-\underset{\underset{CH_3}{|}}{\overset{\overset{CH_3}{|}}{Si}}O-\underset{\underset{CH_3}{|}}{\overset{\overset{CH_3}{|}}{Si}}O-\underset{\underset{CH_3}{|}}{\overset{\overset{CH_2CH_2C_4F_9}{|}}{Si}}OLi$$

as a lithium silanolate. Also, neutralization and silylation were carried out in the same manner as in Example 1 except that the halosilane was used in an amount of 4.0 g (0.033 mol) and the disilazane in an amount of 9.2 q (0.0496 mol).

The resulting polymerization product was purified to remove cyclopolysiloxanes therefrom in the same manner as in Example 1, to give 963 g of an organopolysiloxane (3,340 cSt). The organopolysiloxane was put to FID analysis in the same manner as in Example 1, to be found to have a cyclopolysiloxane content of 23 ppm or less.

Furthermore, the obtained organopolysiloxane was subjected to IR absorption spectrum and $^1$H-NMR spectrum measurements and to terminal vinyl group determination. The results are given below.

Figure 4:
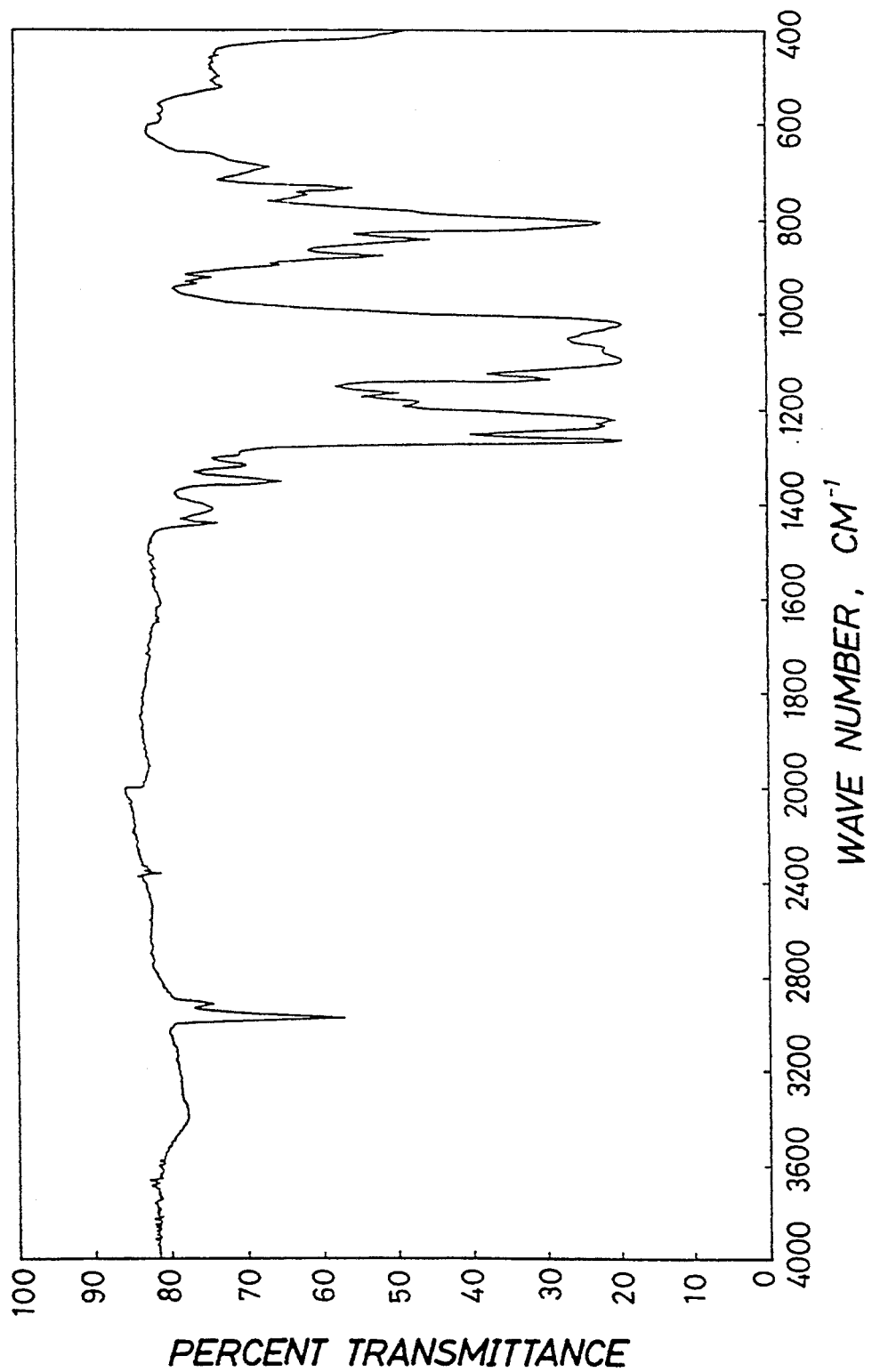

—IR absorption spectrum: Chart is shown in FIG. 4.
Characteristic absorptions:
1000–1130 cm$^{-1}$ (Si—O—Si)
2970, 1260, 810 cm$^{-1}$ (Si—CH$_3$)
1000–1450 cm$^{-1}$ (C—F)

| $^1$H-NMR: (flon-113 solvent) δ |
| --- |
| 0.72–1.60 ppm (m —CH$_2$—Si— 2H) |
| 1.74–2.80 ppm (m —CH$_2$—CF 2H) |
| 0.15–0.61 ppm (m —Si—CH$_3$ 15H) |

—Amount of terminal vinyl groups:
Found 0.0042 mol/100 g
Calcd. 0.0043 mol/100 g From the above results, the obtained organopolysiloxane was confirmed to be a chain organopolysiloxane having the following average molecular formula:

$$CH_2=CH\underset{\underset{CH_3}{|}}{\overset{\overset{CH_3}{|}}{Si}}-O\left[\underset{\underset{CH_3}{|}}{\overset{\overset{CH_3}{|}}{(Si-O)_2}}\underset{\underset{CH_3}{|}}{\overset{\overset{CH_2CH_2C_4F_9}{|}}{Si}}-O\right]_{102}\underset{\underset{CH_3}{|}}{\overset{\overset{CH_3}{|}}{Si}}-CH=CH_2.$$

Example 3

A polymerization reaction was carried out according to the same procedure as in Example 1 except for using 1000 g ( 1.458 mol) of a compound of the following formula:

$$\left[\underset{\underset{CH_3}{|}}{\overset{\overset{CH_3}{|}}{SiO}}-\underset{\underset{CH_3}{|}}{\overset{\overset{CH_3}{|}}{SiO}}-\underset{\underset{CH_3}{|}}{\overset{\overset{CH_2-CF-O-CF_2CF-O-CF_2CF_2CF_3}{|\quad\quad\quad\quad|}}{\overset{\overset{CH_2\quad\quad CF_3\quad\quad CF_3}{|}}{SiO}}}\right]$$

as a fluorine-containing cyclotrisiloxane and 11.9 g (0.01458 mol) of a compound of the following formula:

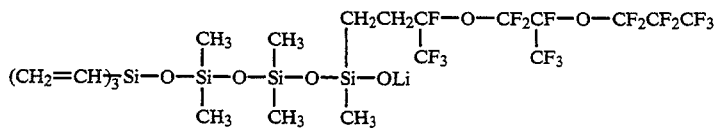

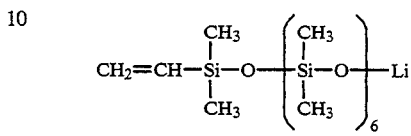

as a lithium silanolate. Also, neutralization and silylation were carried out in the same manner as in Example 1 except that the halosilane was used in an amount of 2.6 g (0.0219 mol) and the disilazane in an amount of 6.1 g (0.0328 mol).

The polymerization product thus obtained was extracted several times with 2,000 g of acetone to remove cyclopolysiloxanes therefrom. Finally, the solvent was distilled off under the conditions of 150° C. and 2 mmHg, upon which 938 g of an organopolysiloxane (3,570 cSt) was obtained. When the organopolysiloxane was subjected to FID analysis in the same manner as in Example 1, the content of cyclopolysiloxanes was found to be 1 ppm or less.

Furthermore, the organopolysiloxane was subjected to measurements of IR absorption spectrum and $^1$H-NMR spectrum and to determination of terminal vinyl groups, to give the results as follows.

Figure 5:
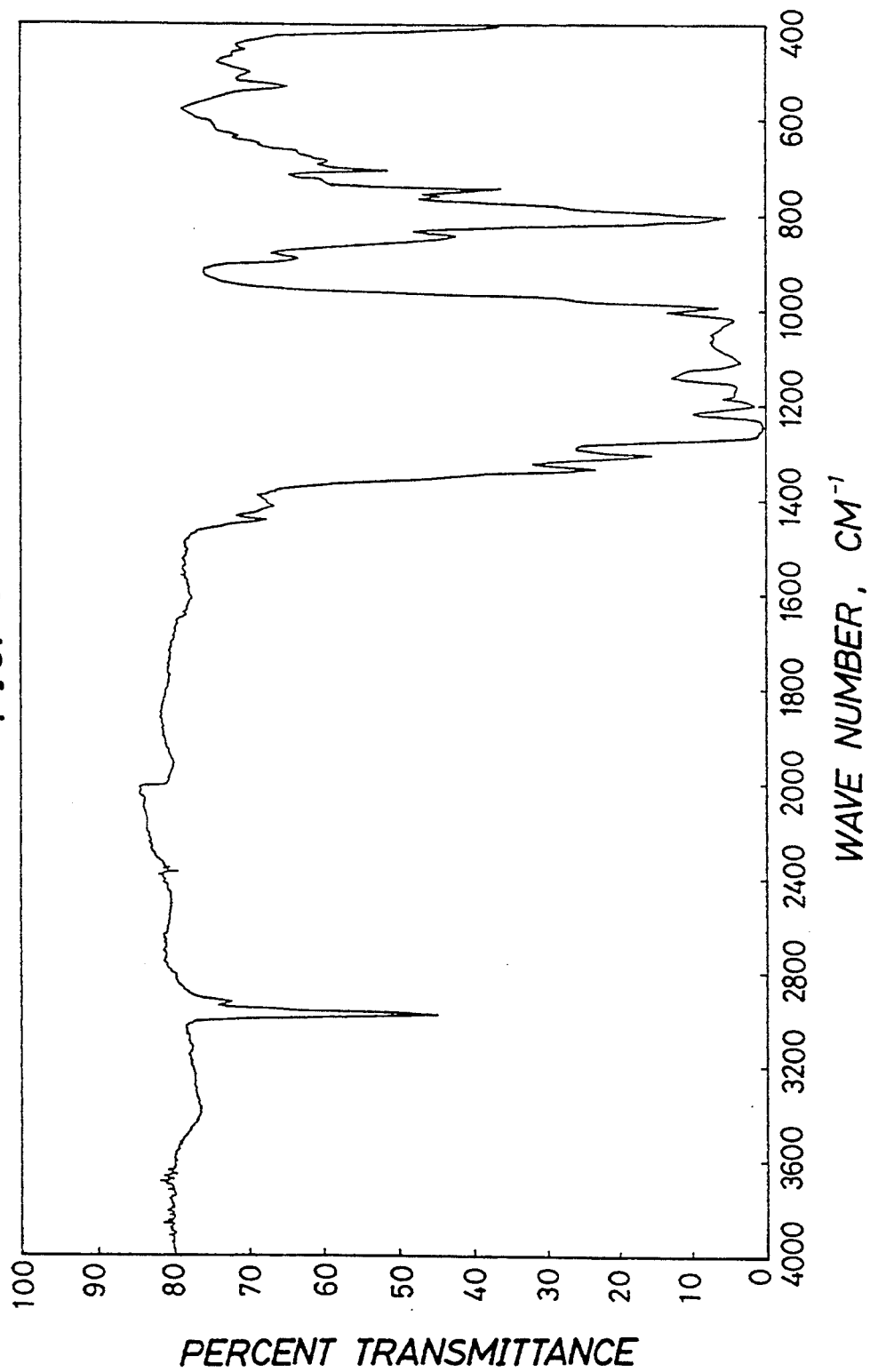

—IR absorption spectrum: Chart is shown in FIG. 5.
  Characteristic absorptions:
    1000–1300 cm$^{-1}$ (Si—O—Si)
    2970, 1260, 810 cm$^{-1}$ (Si—CH$_3$)
    1000–1450 cm$^{-1}$ (C—F)

| $^1$H-NMR: (flon-113 solvent) |
| --- |
| δ |
| 0.77–1.73 ppm (m —CH$_2$—Si—2H) |
| 2.03–2.87 ppm (m —CH$_2$—Cf 2H) |
| 0.02–0.70 ppm (m —Si—CH$_3$ 15H) |

—Amount of terminal vinyl groups:
  Found 0.0055 mol/100 g
  Calcd. 0.0058 mol/100 g From the above results it was confirmed that the organopolysiloxane obtained is a chain organopolysiloxane having the following average molecular formula:

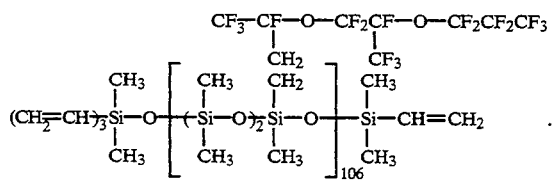

Comparative Example 1

A polymerization reaction was conducted according to the same procedure as in Example 1 except that 1000 g (4.505 mol) of hexamethylcyclotrisiloxane was used as a cyclotrisiloxane and 24.9 g (0.045 mol) of a compound of the following formula:

was used as a lithium silanolate. Also, neutralization and silylation were carried out in the same manner as in Example 1 except for using the halosilane in an amount of 8.1 g (0.0675 mol) and the disilazane in an amount of 18.7 g (0.101 mol).

The polymerization product obtained was purified to remove cyclopolysiloxanes in the same manner as in Example 1, to give 891 g of a dimethylpolysiloxane (2410 cSt). When subjected to FID analysis in the same manner as in Example 1, the organopolysiloxane was found to contain 583 ppm of cyclopolysiloxanes composed of 15 or more siloxane units.

Example 4

A four-necked 1-liter flask equipped with a stirring rod, thermometer and reflux condenser was charged with 1000 g (1.46 mol) of a cyclotrisiloxane having the following formula:

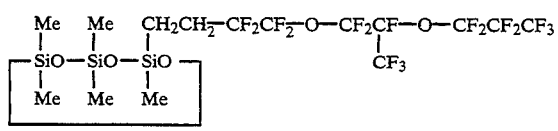

(Me stands for the methyl group, in this formula and hereinafter), 0.75 g (0.02 mol) of a 40% THF solution of water, and 1.0 g of tetraglyme. After the mixture in the flask was heated to 100° C., 19.2 g (5.4×10$^{-3}$ mol) of a 5% THF solution of a lithium silanolate of the following formula:

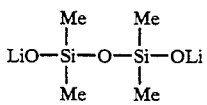

was added to the mixture, and reaction was allowed to take place for 5 hours.

After the reaction, the reaction mixture was cooled to 80° C., and 8.9 g of tetrachloroethane was added to perform neutralization over 3 hours. Then, the resulting salts were filtered off, and the solvent and the like were distilled off under a reduced pressure.

Further, the reaction product obtained was passed through a thin-film type distillation device under the conditions of 150° C. and 1×10$^{-5}$ Torr, to give a colorless, transparent, silanol group-terminated organopolysiloxane which had a viscosity of 5,286 cSt, a refractive index of 1.3442, a specific gravity of 1.41 and a silanol group content of 0.006 mol/100 g.

The organopolysiloxane thus obtained was subjected to determination of cyclopolysiloxanes in the same manner as in Example 1. The content of cyclopolysiloxanes was 1 ppm or less.

Also, measurements of IR absorption spectrum and $^1$H-NMR spectrum gave the following results.

Figure 6:
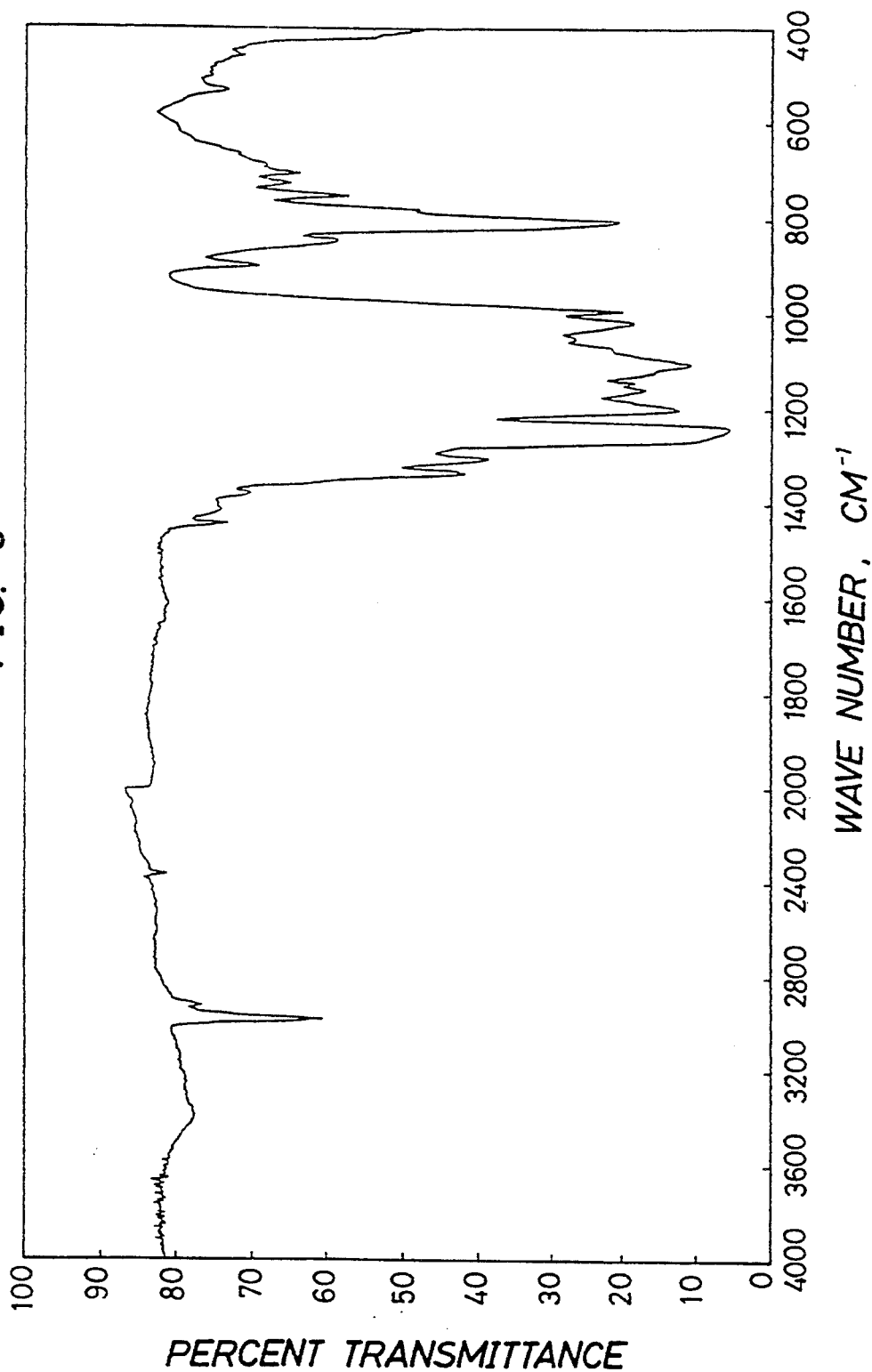

—IR absorption spectrum: Chart is shown in FIG. 6.
  Characteristic absorptions:
    990–1130 cm$^{-1}$ (Si—O—Si)
    2970, 1260, 800 cm$^{-1}$ (Si—CH$_3$)
    990–1400 cm$^{-1}$ (C—F)

| $^1$H-NMR spectrum: δ |
|---|
| 0.75–1.60 ppm (m —CH$_2$—Si—2H) |
| 1.83–2.83 ppm (m —CH$_2$—CF 2H) |
| 0.21–0.52 ppm (m —Si—CH$_3$ 15H) |

From the above results it was confirmed that the organopolysiloxane obtained is a chain organopolysiloxane having the following average molecular formula:

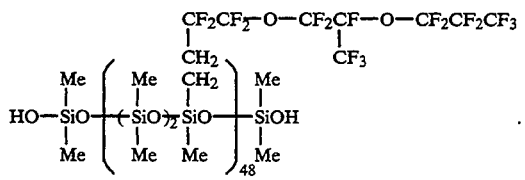

Example 5

A four-necked flask was charged with 100 g (0.15 mol) of a cyclotrisiloxane having the following formula:

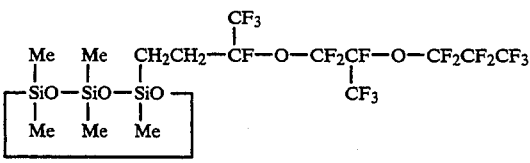

0.05 g (1.1×10$^{-3}$ mol) of a 40% THF solution of water, and 0.1 g of tetraglyme. After heating to 100° C., 0.99 g (2.78×10$^{-4}$ mol) of a 5% THF solution of the same lithium silanolate as that used in Example 4 was added into the flask, to perform polymerization reaction for 5 hours.

After the reaction, the reaction mixture was neutralized with 0.4 g of tetrachloroethane, and treated according to the same procedure as in Example 1, to, give a colorless, transparent, silanol group-terminated organopolysiloxane which had a viscosity of 8,209 cSt, a refractive index of 1.3444, a specific gravity of 1.41 and a silanol group content of 0.004 mol/100 g.

The amount of cyclopolysiloxanes contained in the obtained organopolysiloxane was determined in the same manner as in Example 1, and found to be 15 ppm.

Further, the organopolysiloxane was subjected to measurements of IR absorption spectrum and $^1$H-NMR spectrum, the results being given below.

Figure 7:
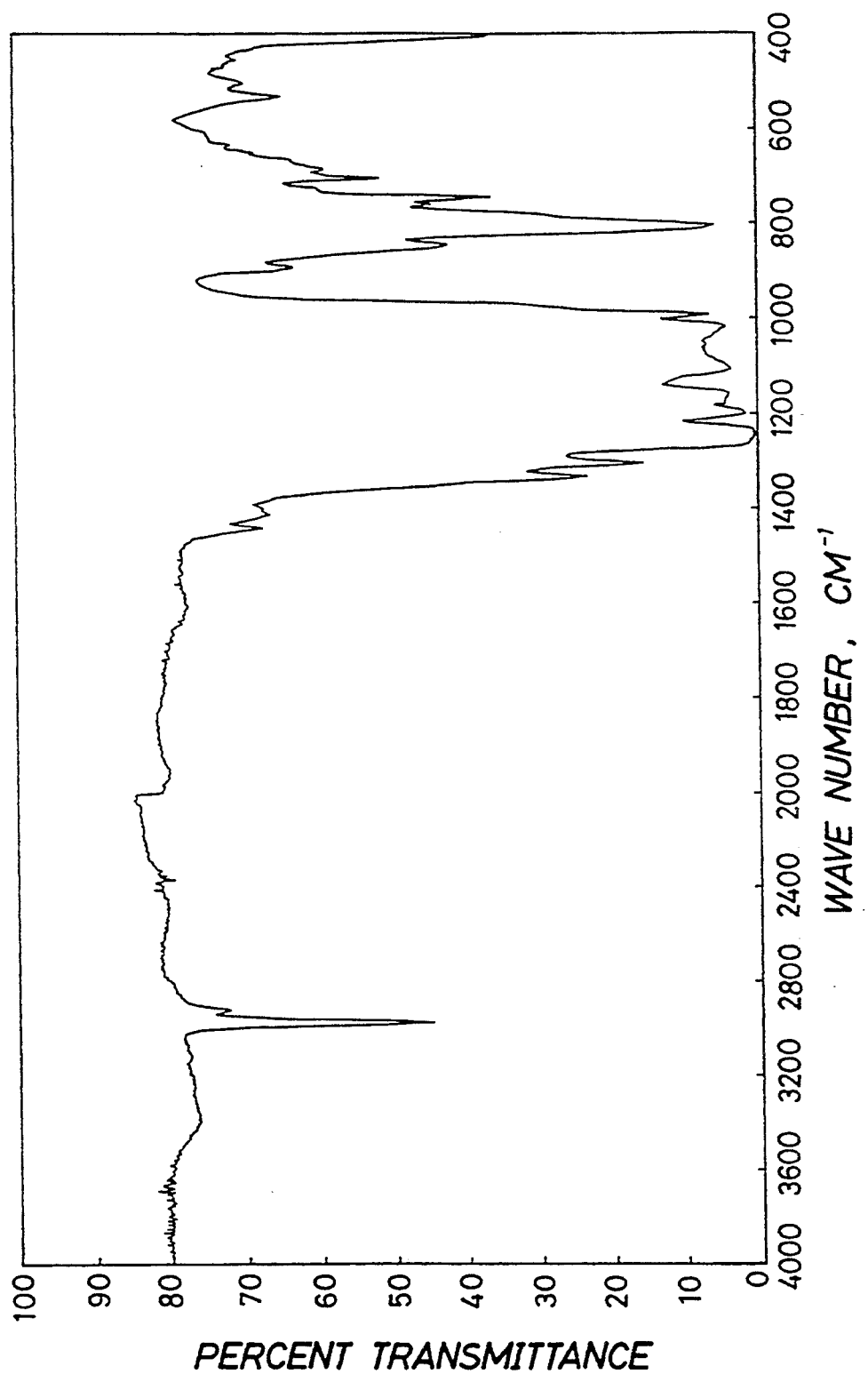

—IR absorption spectrum: Chart is shown in FIG. 7.
  Characteristic absorptions:
    990–1130 cm$^{-1}$ (Si—O—Si)
    2970, 1260, 800 cm$^{-1}$ (Si—CH$_3$)
    990–1380 cm$^{-1}$ (C—F)

| $^1$H-NMR spectrum: δ |
|---|
| 0.77–1.73 ppm (m —CH$_2$—Si— 2H) |
| 2.03–2.87 ppm (m —CH$_2$—CF 2H) |
| 0.02–0.70 ppm (m —Si—CH$_3$ 15H) |

From the above results, the organopolysiloxane obtained was confirmed to be a chain organopolysiloxane having the following average molecular formula:

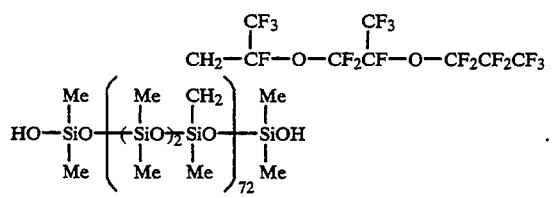

Example 6

A four-necked flask was charged with 100 g (0.22 mol) of a fluorine-containing cyclotrisiloxane having the following formula:

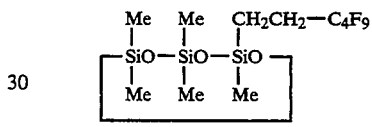

0.4 g (8.80×10$^{-3}$ mol) of a 40% THF solution of water, and 0.1 g of tetraglyme. After the contents of the flask was heated to 100° C. 0.705 g (1.98×10$^{-4}$ mol) of a 5% THF solution of the same lithium silanolate as that used in Example 4 was added thereto, followed by reaction for 5 hours.

After the reaction, the reaction mixture was neutralized with 0.3 g of tetrachloroethane, and treated according to the same procedure as in Example 1, to give a colorless, transparent, silanol group-terminated organopolysiloxane which had a viscosity of 3,611 cSt, a refractive index of 1.3673, a specific gravity of 1.27 and a silanol group content of 0.009 mol/100 g.

The amount of cyclopolysiloxanes contained in the obtained organopolysiloxane was determined in the same manner as in Example 1, and found to be 1 ppm or less.

Further, the organopolysiloxane was measured for IR absorption spectrum and $^1$H-NMR spectrum. The results are given below.

Figure 8:
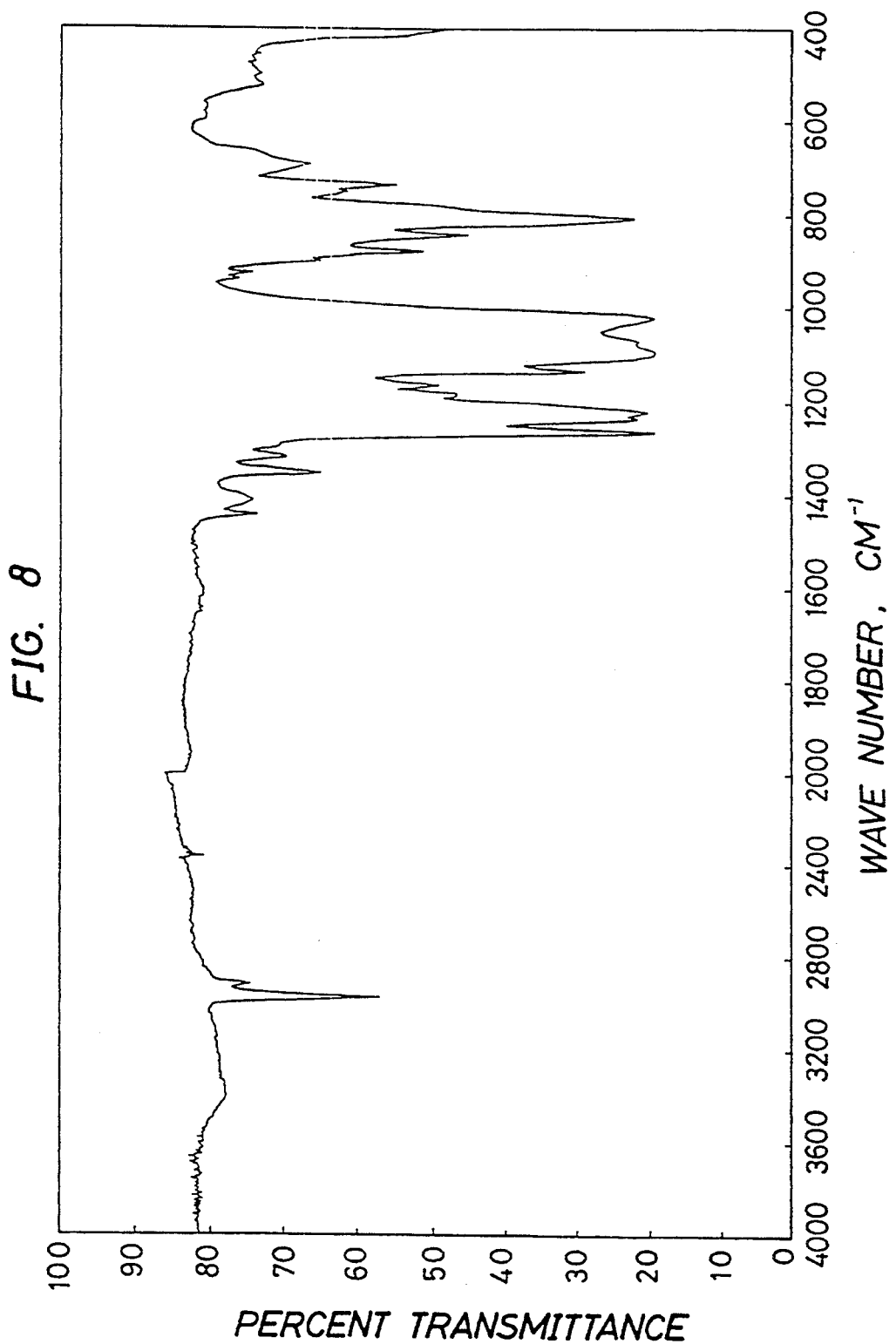

—IR absorption spectrum: Chart is shown in FIG. 8.
  Characteristic absorptions:
    990–1140 cm$^{-1}$ (Si—O—Si)
    2970, 1260, 800 cm$^{-1}$ (Si—CH$_3$)
    990–1450 cm$^{-1}$ (C—F)

| $^1$H-NMR spectrum: δ |
|---|
| 0.72–1.58 ppm (m —CH$_2$—Si— 2H) |
| 1.75–2.82 ppm (m —CH$_2$—CF 2H) |
| 0.15–0.62 ppm (m —Si—CH$_3$ 15H) |

It was confirmed by the above results that the organopolysiloxane obtained is a chain organopolysiloxane having the following average molecular formula:

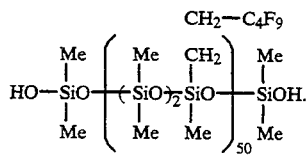

Example 7

A four-necked flask was charged with 100 g (0.25 mol) of the same fluorine-containing cyclotrisiloxane as that used in Example 1, 0.3 g (0.02 mol) of water, 4 ml dimethyl sulfoxide, and 1.0 g of a silane compound having the following formula:

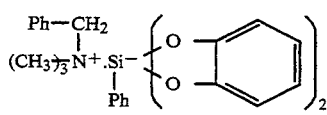

and the resulting mixture in the flask was heated at 110° C. for 5 hours, upon which a viscous liquid was obtained.

The viscous liquid was subjected to thin-film distillation in the same manner as in Example 4, to give a colorless, transparent, silanol group-terminated organopolysiloxane which had a viscosity of 5,443 cSt, a refractive index of 1.3442, a specific gravity of 1.41 and a silanol group content of 0.006 mol/100 g.

Determination of cyclopolysiloxanes was carried out in the same manner as in Example 1, to give a value of 23 ppm.

Further, the organopolysiloxane was subjected to IR absorption spectrum and $^1$H-NMR spectrum measurements.
The results are given below.
—IR absorption spectrum:
  Characteristic absorptions:
   990–1140 cm$^{-1}$ (Si—O—Si)
   2970, 1260, 800 cm$^{-1}$ (Si—CH$_3$)
   990–1450 cm$^{-1}$ (C—F)

| $^1$H-NMR spectrum: δ |
| --- |
| 0.76–1.62 ppm (m —CH$_2$—Si— 2H) |
| 1.80–2.91 ppm (m —CH$_2$—CF 2H) |
| 0.19–0.59 ppm (m —Si—CH$_3$ 15H) |

From the above results, the organopolysiloxane obtained was confirmed to be an organopolysiloxane having the following average molecular formula:

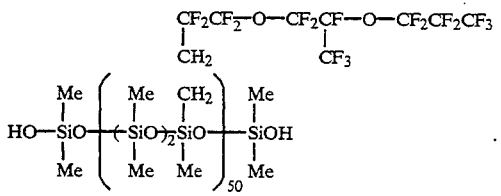

Example 8

A 1-liter separable flask equipped with a stirrer was charged with 1000 g (1.458 mol) of a cyclotrisiloxane of the following formula:

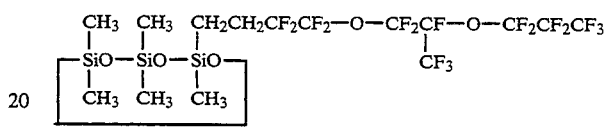

2.27 g (0.00972 mol) of pentamethylvinylcyclotrisiloxane, 7.7 g (0.00972) mol of a lithium silanolate having the following formula:

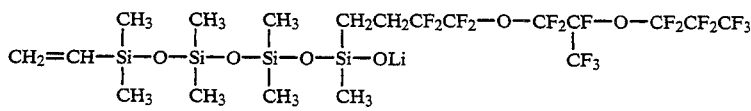

and 1.0 g of tetraglyme. The resulting mixture in the flask was heated to 100° C. in a nitrogen atmosphere, and permitted to react for 5 hours.

Then, the reaction mixture was cooled to 50° C., at which 1.76 g (0.01458 mol) of vinyldimethylchlorosilane and 4.05 g (0.022 mol) of disilazane having the following formula:

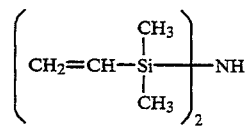

were added to the flask, followed by stirring for 2 hours to effect neutralization. Thereafter, the reaction mixture was subjected to stripping at 150° C. under a reduced pressure and to removal of salts by filtration, to give 952 g of an organopolysiloxane (14,150 cSt).

The reaction product obtained was then passed through a thin-film type molecular distillation device under the conditions of 270° C. and 1×10$^{-4}$ mmHg, to give 926 g of an organopolysiloxane (viscosity: 15,010 cSt).

The organopolysiloxane thus obtained was subjected to determination of cyclopolysiloxanes in the same manner as in Example 1. The content of cyclopolysiloxanes was 1 ppm or less.

Figure 9:
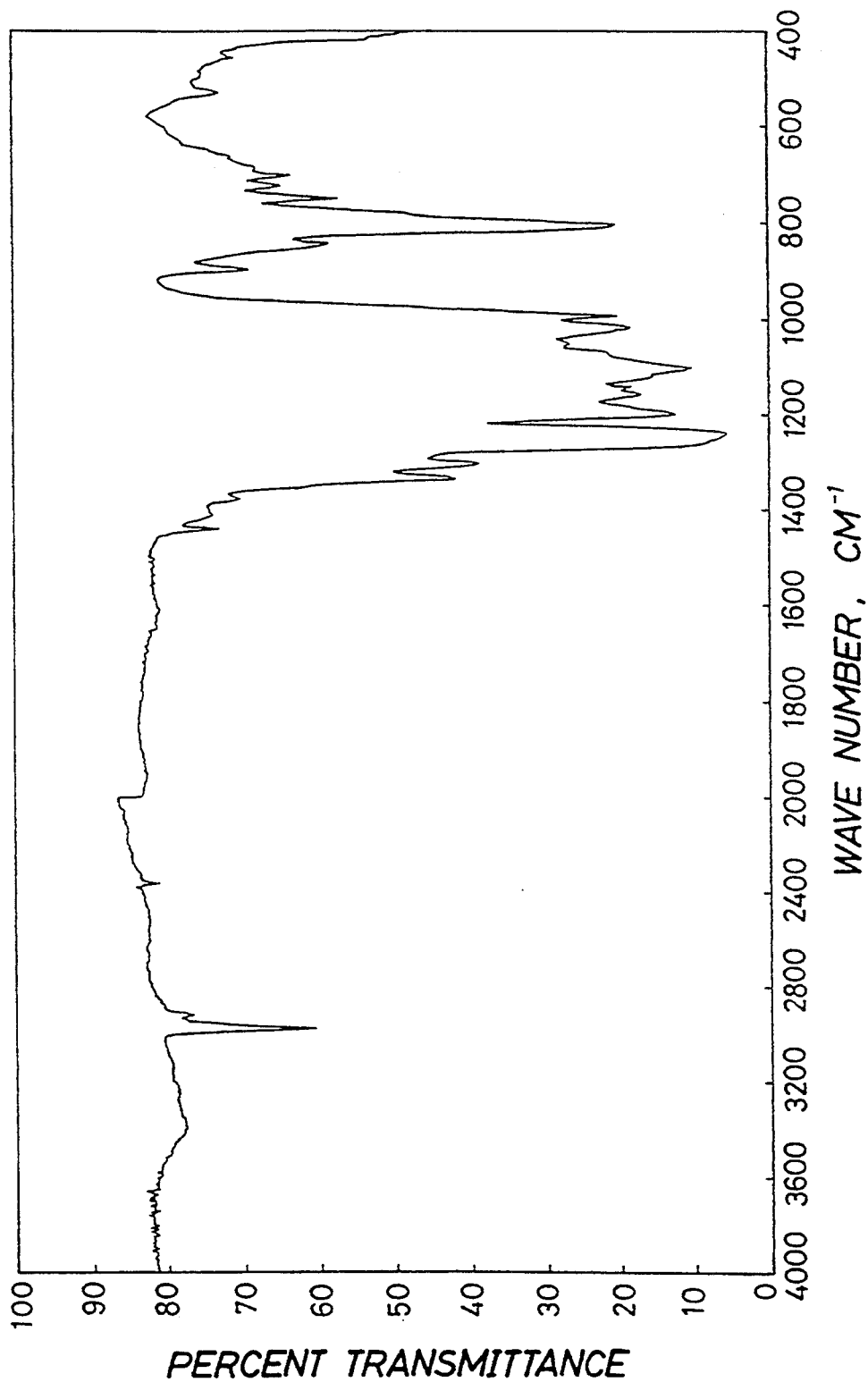
FIGS. 9 and 10 show IR charts of purified organopolysiloxanes obtained in Examples 8 and 9, respectively.

Further, the organopolysiloxane was subjected to IR absorption spectrum and $^1$H-NMR spectrum measurements and to vinyl group determination. The results are given below.
—IR absorption spectrum: Chart is shown in FIG. 9.
  Characteristic absorptions:
   990–1130 cm$^{-1}$ (Si—O—Si)
   2970, 1260, 810 cm$^{-1}$ (Si—CH$_3$)

1000-1450 cm$^{-1}$ (C—F)

| $^1$H-NMR spectrum: (flon-113 solvent) $\delta$ |
|---|
| 0.76–1.60 ppm (m —CH$_2$—Si— 2H) |
| 1.83–2.81 ppm (m —CH$_2$—CF 2H) |
| 0.21–0.52 ppm (m —Si—CH$_3$ 15H) |

| Vinyl group determination: Determined by GC-MS. | | |
|---|---|---|
| | Amount (mol/100 g) | |
| | Found | Calcd. |
| Terminal vinyl groups: | 0.0017 | 0.0019 |
| Vinyl groups in side chains: | 0.0012 | 0.0010 |

From the above results, it was confirmed that the obtained organopolysiloxane has the following average molecular formula:

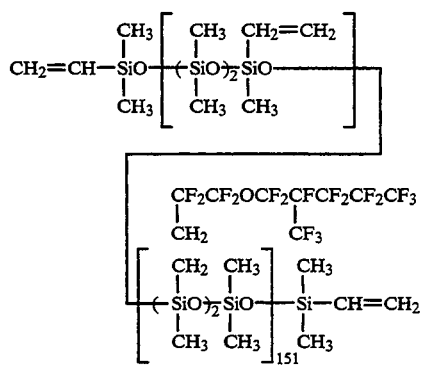

Example 9

A polymerization reaction was carried out according to the same procedure as in Example 8 except for using 1000 g (2.303 mol) of a compound of the following formula:

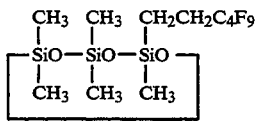

as a fluorine-containing cyclotrisiloxane, using the pentamethylvinylcyclotrisiloxane in an amount of 15.5 g (0.0661 mol) and using 3.9 g (0.022 mol) of a compound of the following formula:

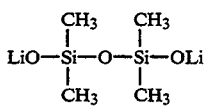

as a lithium siliconate. After the reaction, the reaction mixture was neutralized with 32 g of 10% diluted hydrochloric acid and after-treated. The polymerization product obtained was passed through a thin-film type molecular distillation device under the conditions of 200° C. and 1×10$^{-4}$ mmHg, to remove cyclopolysiloxanes therefrom, whereby 936 g of an organopolysiloxane (3,800 cSt) was obtained.

When the organopolysiloxane was subjected to FID analysis in the same manner as in Example 1, the content of cyclopolysiloxanes was found to be 15 ppm.

Further, measurements of IR absorption spectrum and $^1$H-NMR spectrum and determination of vinyl groups in side chains were carried out. The result are given below.

Figure 10:
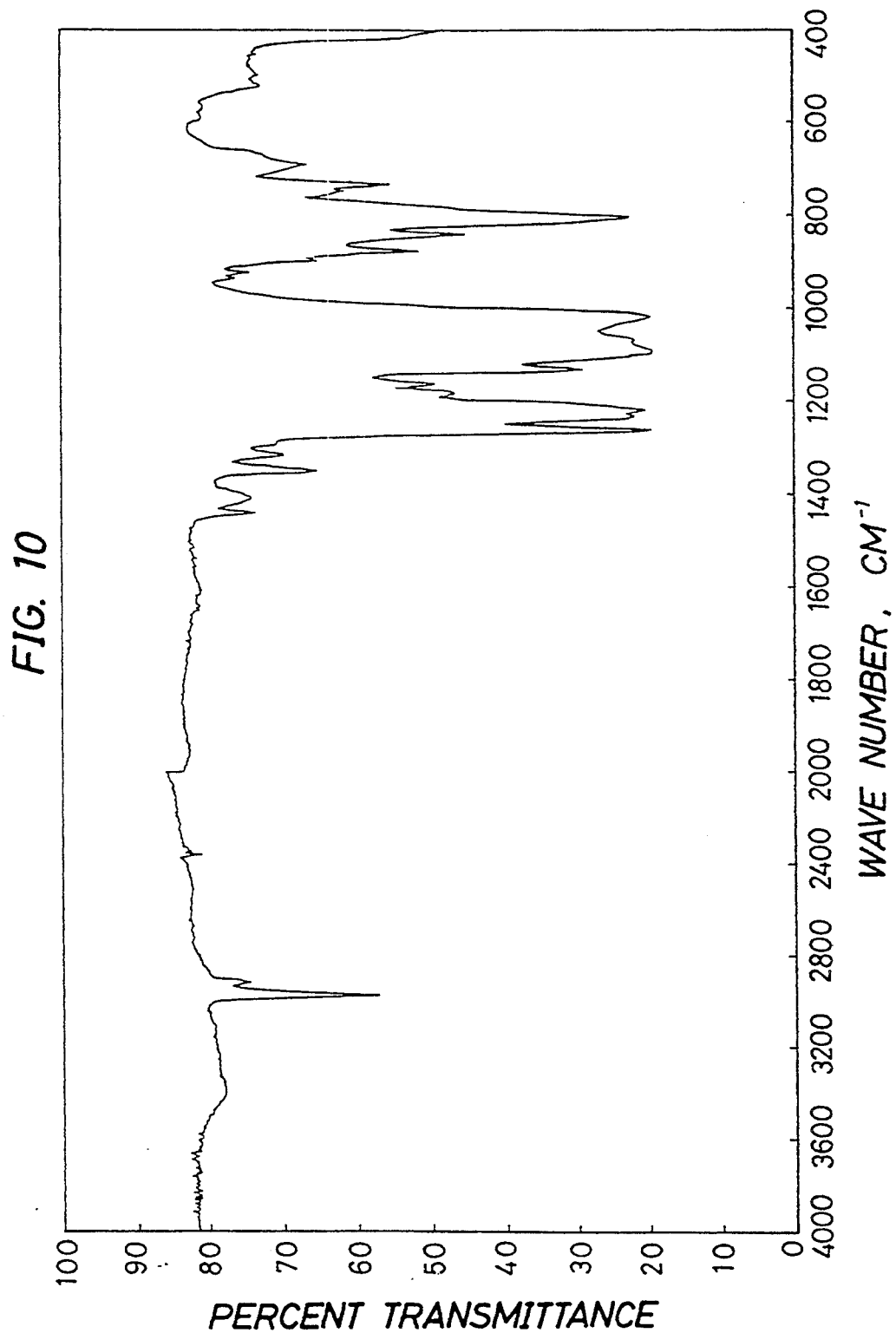

—IR absorption spectrum: Chart is shown in FIG. 10. Characteristic absorptions:
 1000–1130 cm$^{-1}$ (Si—O—Si)
 2970, 1260, 810 cm$^{-1}$ (Si—CH$_3$)
 1000–1450 cm$^{-1}$ (C—F)

| $^1$H-NMR spectrum: (flon-113 solvent) $\delta$ |
|---|
| 0.70–1.62 ppm (m —CH$_2$—Si— 2H) |
| 1.75–2.80 ppm (m —CH$_2$—CF 2H) |
| 0.14–0.63 ppm (m —Si—CH$_3$ 15H) |

—Amount of vinyl groups in side chains:
 Found 0.0061 mol/100 g
 Calcd. 0.0065 mol/100 g From the above results, the obtained organopolysiloxane was ascertained to have the following average molecular formula:

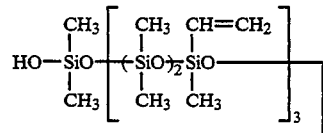
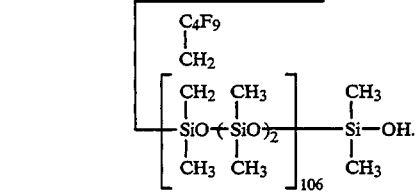

We claim:

1. A chain organopolysiloxane having the following formula (1):

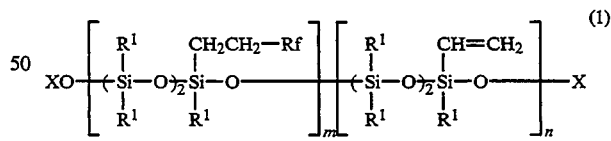

wherein
R$^1$ are each independently an unsubstituted or substituted monovalent hydrocarbon group,
Rf are each independently a fluorine-containing group of the following formula (1a):

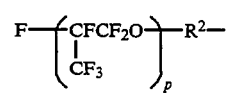

or the following formula (1b):
C$_L$F$_{2L+1}$—  (1b)

wherein in the formulas (1a) and (1b), $R^2$ is —CF(CF$_3$)—, —CF$_2$CF$_2$— or —CF(CF$_3$)CF$_2$—, p is an integer of 1 to 5, and L is an integer of 1 to 20, X are each a hydrogen atom or a group of the following formula (1c):

(1c)

wherein $R^3$ is an unsubstituted or substituted monovalent hydrocarbon group, and q is an integer of 0 to 3, m is an integer of 15 to 4000, and n is an integer satisfying the relationship of $$0 \leq \frac{n}{n+m} \leq 0.1,$$

wherein the content of cyclopolysiloxanes having a polymerization degree of less then 10 in said chain organopolysiloxane is not more than 50 ppm.

2. The chain organopolysiloxane of claim 1, wherein Rf in said general formula (1) are each independently

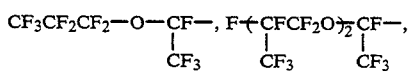

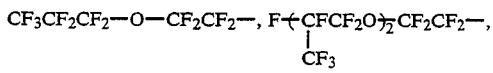

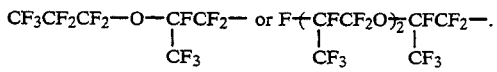

3. The chain organopolysiloxane of claim 1, wherein Rf in said general formula (1) are each independently

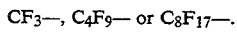

4. The chain organopolysiloxane of claim 1, wherein in said general formula (1), n is 0, and X are each a group of said formula (1c).

5. The chain organopolysiloxane of claim 1, wherein in said general formula (1), n is 0, and X are each a hydrogen atom.

6. A process for producing a chain organopolysiloxane having the following formula (1):

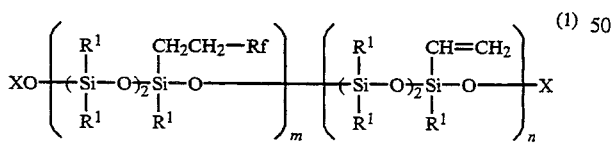
(1)

wherein $R^1$ are each independently an unsubstituted or substituted monovalent hydrocarbon group, Rf are each independently a fluorine-containing group of following formula (1a):

(1a)

or the following formula (1b):

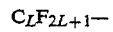
(1b)

wherein in the formulas (1a) and (1b), $R^2$ is —CF(CF$_3$)—, —CF$_2$CF$_2$— or —CF(CF$_3$)CF$_2$—, p is an integer of 1 to 5, and L is an integer of 1 to 20, X are each a hydrogen atom or a group of the following formula (1c):

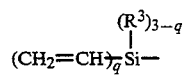
(1c)

wherein $R^3$ is an unsubstituted or substituted monovalent hydrocarbon group, and q is an integer of 0 to 3, m is an integer of 15 to 4000, and n is an integer satisfying the relationship of $$0 \leq \frac{n}{n+m} \leq 0.1,$$

wherein the content of cyclopolysiloxanes having a polymerization degree of less then 10 in said chain organopolysiloxane is not more than 50 ppm, comprising the steps of:

polymerizing a fluorine-containing cyclotrisiloxane of the following formula (2):

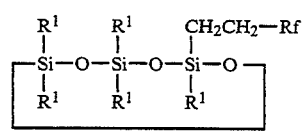
(2)

wherein $R^1$ and Rf are as defined above, or a mixture of said fluorine-containing cyclotrisiloxane and a vinyl-containing cyclotrisiloxane of the following formula (3):

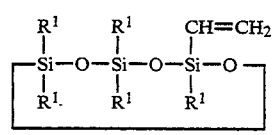
(3)

wherein $R^1$ is as defined above, in the presence of a lithium silanolate catalyst or a catalyst represented by the following formula (4):

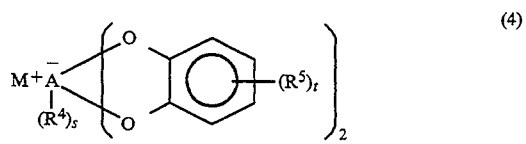
(4)

wherein $R^4$ and $R^5$ are each independently a monovalent organic group,

M is $(R^6)_4$N, $(R^6)_4$P or an alkali metal atom, wherein $R^6$ is a monovalent organic group, A is a silicon atom or a boron atom, s is 1 where A is a silicon atom, and 0 where A is a boron atom, and t is an integer of 0 to 2; and subjecting the resulting polymerization product to a purification treatment comprising heating at a temperature not lower than 100° C. under reduced pressure not higher than $10^{-1}$ mm/Hg, or extraction with solvent, or both, thereby removing volatile components from the polymerization product and obtaining said chain organopolysiloxane of formula (1) wherein the content of cyclopolysiloxanes having a polymerization degree of less than 10 is not more than 50 ppm.

7. The process of claim 6, wherein the catalyst component contained in the polymerization product is inactivated prior to said purification treatment.

8. The process of claim 7, wherein the catalyst component is inactivated by neutralization with an acidic substance.

9. The process of claim 6, wherein prior to said purification treatment, the polymerization product is silylated by means of a silylating agent represented by the following formula (5):

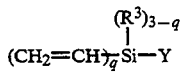

wherein $R^3$ and q are as defined in claim 6, and Y is a hydrolyzable group.

10. The process of claim 9, wherein the silylating agent is a triorganohalosilane compound.

11. The process of claim 10, wherein the silylation is carried out by means of a disilazane compound of the following formula (6):

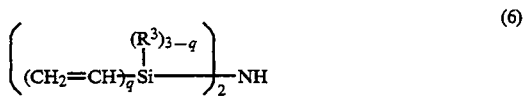

wherein $R^3$ and q are as defined in claim 6, in combination with said silylating agent.

* * * * *